United States Patent
Periaswamy (10) Patent No.: US 7,397,936 B2
(45) Date of Patent: Jul. 8, 2008

(54) METHOD AND SYSTEM FOR WAVELET BASED DETECTION OF COLON POLYPS

(75) Inventor: Senthil Periaswamy, Exton, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 650 days.

(21) Appl. No.: 10/915,077

(22) Filed: Aug. 10, 2004

(65) Prior Publication Data

US 2005/0105801 A1    May 19, 2005

Related U.S. Application Data

(60) Provisional application No. 60/494,665, filed on Aug. 13, 2003.

(51) Int. Cl.
*G06K 9/00* (2006.01)
(52) U.S. Cl. .................. 382/128; 382/100; 382/276; 382/192
(58) Field of Classification Search ............... 382/128, 382/192, 276, 100
See application file for complete search history.

(56) References Cited

U.S. PATENT DOCUMENTS

| 5,598,481 | A | * | 1/1997 | Nishikawa et al. ......... 382/130 |
| 5,673,332 | A |   | 9/1997 | Nishikawa et al. |
| 5,987,094 | A |   | 11/1999 | Clarke et al. |
| 6,078,680 | A | * | 6/2000 | Yoshida et al. ............ 382/128 |
| 7,194,117 | B2 | * | 3/2007 | Kaufman et al. ........... 382/128 |

OTHER PUBLICATIONS

Stephane Mallat and Sifen Zhong, "Characterization of Signals from Multiscale Edges", IEEE Transactions on Pattern Analysis and Machine Intelligence, vol. 14, No. 7 Jul. 1992 pp. 710-732.*
Summers, RM et al., "Automated Polyp Detector For CT Colonography: Feasibility Study" Radiology 2000; pp. 216:284-290.
Summers, RM et al., "Automated Polyp Detection at CT Colonography: Feasibility Assesment in a Human Population," Radiology 2001; pp. 219:51-59.
Paik et al., "Computer Aided Detection of Polyps in CT Colonography; Method and Free Response ROC Evaluation of Performance," Radiology 2000, pp. 217:704.
Masutani, et al., "Computer Aided Detection of Polyps in CT Colonography based on Geometric Features" Proc SPIE 2001, pp. 4321:53-57.

(Continued)

*Primary Examiner*—Samir A. Ahmed
*Assistant Examiner*—Eric Rush (57) ABSTRACT

A method of identifying colon polyps in a digital volume, wherein the volume includes a plurality of values corresponding to a domain of points in a 3D space, is provided. The method includes selecting a mother wavelet scaling function that corresponds to a polyp; performing a forward wavelet transformation on the volume to obtain a set of wavelet coefficients, wherein each wavelet coefficient is associated with a length scale; determining, for each length scale, a transformation magnitude; and forming, for each length scale, a transformed set of wavelet coefficients associated with the length scale. An inverse wavelet transform is performed on the transformed wavelet coefficients for each length scale to obtain a reconstructed volume, and the reconstructed volume is analyzed for the existence of polyps.

3 Claims, 5 Drawing Sheets

OTHER PUBLICATIONS

Masutani, et al., "Detection of Colonic Polyps in CT Colonography based on geometric features" Radiology 2000; 217:1555.

G. Fernandez, et al. "LIFTPACK: A Software Package for Wavelet Transforms using lifting," Proceedings of the SPIE, The International Society for Optical Engineering 2825, 1996, pp. 396-408.

W. Sweldens, et al., "The Lifting Scheme: A New Philosophy In Biorthogonal Wavelet Constructions," Proceedings of the SPIE—The International Society of Optical Engineering 2569, 1995, pp. 68-79.

* cited by examiner

Biorthogonal wavelet scaling function.
Note that it is similiar in shape to a polyp.

FIG. 2

2-D examples, showing the original polyp (first column), the wavelet response (second column) and the original polyp overlaid with the wavelet response (third column). As can be seen, there is a good response in the location of the polyp.

FIG. 3

3-D example. Shown in the top row are 3 orthogonal slices of a polyp subvolume, with the polyp located in the center. Shown in the bottom row are the wavelet responses for the corresponding slices. Note that the wavelet response in the center of the volume region is much higher in the region of the polyp.

METHOD AND SYSTEM FOR WAVELET BASED DETECTION OF COLON POLYPS

CROSS REFERENCE TO RELATED UNITED STATES APPLICATIONS

This application claims priority from "Wavelet based detection of colon polyps", Provisional Patent Application No. 60/494,665 of Senthil Periaswamy, filed Aug. 13, 2003, the contents of which are incorporated herein by reference.

BACKGROUND OF THE INVENTION

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital acquisition systems for creating digital images include digital X-ray film radiography, computed tomography ("CT") imaging, magnetic resonance imaging ("MRI"), ultrasound ("US") and nuclear medicine imaging techniques, such as positron emission tomography ("PET") and single photon emission computed tomography ("SPECT"). Digital images can also be created from analog images by, for example, scanning analog images, such as typical x-rays, into a digitized form. However, the large amount of data in digital images is generally difficult and tedious for a human, such as a physician, to interpret without additional aid. Computer-aided diagnosis ("CAD") systems play a critical role in aiding the human, especially in the visualization, segmentation, detection, registration, and reporting of medical pathologies.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

Once anatomical regions and structures are constructed and evaluated by analyzing pixels and/or voxels, subsequent processing and analysis exploiting regional characteristics and features can be applied to relevant areas, thus improving both accuracy and efficiency of the imaging system.

One of the more critical CAD tasks includes the screening and early detection of various types of cancer from a volume data (e.g., a CT volume data). For instance, cancers such as colon cancer have shown a decrease in mortality rates resulting from the early detection and removal of cancerous tumors. Pathologies are typically spherical or hemispherical in geometric shape. In many cases, these sphere-like pathologies are attached to linear or piece-wise linear surfaces. Unfortunately, existing methods generally do not detect characteristic symptoms of various cancers until the advanced stages of the disease. Therefore, a primary goal in advancing preventive cancer screening is to provide for earlier detection of the characteristic symptoms.

SUMMARY OF THE INVENTION

In one aspect of the invention, a method of identifying colon polyps in a digital volume, wherein the volume comprises a plurality of values corresponding to a domain of points in a 3D space, is provided. The method includes selecting a mother wavelet scaling function that corresponds to a polyp, performing a forward wavelet transformation on the volume to obtain a set of wavelet coefficients, wherein each wavelet coefficient is associated with a length scale, determining, for each length scale, a transformation magnitude, and forming, for each length scale, a transformed set of wavelet coefficients associated with the length scale. The method also includes performing, for each length scale, an inverse wavelet transform on the transformed wavelet coefficients corresponding to said length scale, to obtain a reconstructed volume, and analyzing said reconstructed volume for the existence of polyps.

In a further aspect of the invention, transformation magnitude comprises a multiplier magnitude, wherein the step of forming a transformed set of wavelet coefficients includes multiplying, for each length scale, the wavelet coefficients by the multiplier for that length scale to from a multiplied coefficient set for said length scale and wherein said step of performing an inverse wavelet transform is performed on said multiplied coefficient set for said length scale.

In a further aspect of the invention, the transformation magnitude comprises a threshold magnitude, wherein the step of forming a transformed set of wavelet coefficients includes selecting, for each length scale, those wavelet coefficients whose magnitudes exceeds the threshold for that length scale, to form a subset of wavelet coefficients associated with the length scale, and wherein said step of performing an inverse wavelet transform is performed on the coefficient subset for the length scale.

In a further aspect of the invention, the transformation magnitude comprises a threshold magnitude, wherein the step of forming a transformed set of wavelet coefficients includes selecting, for each length scale, those wavelet coefficients whose magnitudes exceeds the threshold for that length scale, to form a template subset of wavelet coefficients associated with the length scale. The method further includes the steps of performing a forward wavelet transform of a second volume, to obtain a second set of wavelet coefficients, comparing, for each length scale, coefficients of the second set of wavelet coefficients with coefficients of a template subset for said length scale, wherein a match between the coefficients of the template subset and coefficients of the second set of wavelet coefficients indicates the presence of a polyp corresponding to the length scale.

In another aspect of the invention, a method of identifying colon polyps in a digital volume, wherein the volume includes a plurality of values corresponding to a domain of points in a 3D space, is provided. The method includes selecting a mother wavelet scaling function that corresponds to a polyp and performing a forward wavelet transformation on the volume to obtain a set of wavelet coefficients, wherein each wavelet coefficient is associated with a length scale. For each length scale, a multiplier magnitude associated with that length scale is used to multiply the wavelet coefficients for the same length scale to form a multiplied coefficient set for that length scale. For each set of multiplied coefficients, an inverse wavelet transform is performed to obtain a reconstructed volume, and the reconstructed volume is analyzed for the existence of polyps.

In a further aspect of the invention, a method of identifying colon polyps in a digital volume, wherein the volume includes a plurality of values corresponding to a domain of points in a 3D space, is provided. The method includes selecting a mother wavelet scaling function that corresponds to a polyp and performing a forward wavelet transformation on the volume to obtain a set of wavelet coefficients, wherein each wavelet coefficient is associated with a length scale. For each length scale, a threshold magnitude is determined so that those wavelet coefficients whose magnitudes exceeds the threshold for that length scale are selected to form a subset of wavelet coefficients associated with the length scale. For each subset of wavelet coefficients, an inverse wavelet transform is performed to obtain a reconstructed volume, and the reconstructed volume is analyzed for the existence of polyps.

In a further aspect of the invention, a method of identifying colon polyps in a digital volume, wherein the volume includes a plurality of values corresponding to a domain of points in a 3D space, is provided. The method includes selecting a mother wavelet scaling function that corresponds to a polyp and performing a forward wavelet transformation on the volume to obtain a set of wavelet coefficients, wherein each wavelet coefficient is associated with a length scale. For each length scale, a threshold magnitude is determined to select those wavelet coefficients whose magnitudes exceeds the threshold, to form a template subset of wavelet coefficients associated with the length scale. A forward wavelet transform of a second volume is performed to obtain a second set of wavelet coefficients. For each length scale, coefficients of the second set of wavelet coefficients are compared with coefficients of a template subset for the length scale, wherein a match between the coefficients of the template subset and the coefficients of the second set of wavelet coefficients indicates the presence of a polyp corresponding to the length scale.

In further aspect of the invention, the method includes, prior to performing the forward wavelet transform, calculating a first derivative of the volume, and selecting the mother wavelet function to be similar to a first derivative of a polyp.

In another aspect of the invention, a program storage device readable by a computer, tangibly embodying a program of instructions executable by the computer to perform the method steps for identifying colon polyps in a digital volume, wherein the volume includes a plurality of values corresponding to a domain of points in a 3D space, is provided.

DETAILED DESCRIPTION OF THE PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

A goal of this algorithm is to assist in the automatic detection of polyps in the colon. The input includes 3D scans of the colon, whose value can be, e.g., a magnetic field intensity, and the output includes a wavelet response volume. The response volume can then be used as a feature for detection/classification of the polyp. This idea can be utilized for various imaging modalities, such as PET, CT, MRI, etc. Prior to application of the methods of the invention the 3D volumetric image can be preprocessed to identify structures of interest for further analysis.

Basic Wavelets

Wavelets are function building blocks that can quickly decorrelate data. A given signal $f$ can be decorrelated by wavelets as follows:

$$f = \sum_i \gamma_i \varphi_i$$

where $\gamma_i$ are wavelet coefficients and $\varphi_i$ are wavelets. The wavelet functions have the special property that they are derived from a mother wavelet function, and all other wavelet basis functions are scaled and translated versions of this mother function:

$\varphi(x)$=mother wavelet $\varphi_{l,k}(x) = \varphi(2^l x - k)$ scale=$2^l$ translation=$2^{-l}k$ $$f(x) = \sum_{l,k} \gamma_{l,k} \varphi_{l,k}(2^{-l}x - k),$$

where the mother function can be selected to bring out a feature of interest in the signal $f$. Note that wavelet basis functions and their associated coefficients are indexed by both length scale l and translation k. These wavelets are referred to as biorthogonal wavelets. The characteristic length scale associated with a wavelet of scale index l decreases for increasing l.

Although wavelets are commonly defined in terms of the Fourier transform of a function, there exist alternative methods of calculating wavelet basis functions and their coefficients that do not rely upon Fourier transforms. One such method well known in the art is known as the lifting scheme.

The lifting scheme ensures fast calculation of the forward and inverse wavelet transforms that only involve finite impulse response filters. The transform works for images of arbitrary size with correct treatment of the boundaries, and all of the computations can be done in-place without need of extra memory. Wavelets generated by the lifting scheme are particularly well suited to image analysis since an image is a bounded signal of finite length, as the lifting scheme does not introduced boundary artifacts.

In a preferred method of the invention, a mother wavelet scaling function is selected whose shape is similar to that of a polyp. The wavelet generated by the lifting scheme are preferred because the scaling function has desirable properties and resembles the polyps, and the wavelets can be computed efficiently (leading to a fast implementation). One exemplary wavelet mother function is semi-spherically shaped. Then the wavelet response coefficients will be maximized at the location of structures similar in size and shape to the scaling function. In general, a polyp volume can be transformed into the wavelet domain, and the wavelet coefficients can be interpreted to reflect the similarity of the polyp to the wavelet scaling function. For an image $I(x, y, z)$ of n points that maps $R^3 \rightarrow R$, there can be n wavelet coefficients. These coefficients can then be analyzed to identify potential polyps (candidate detection) or used as a feature to distinguish polyps from non-polyp structures.

First Embodiment

Detection

Figure 1A:
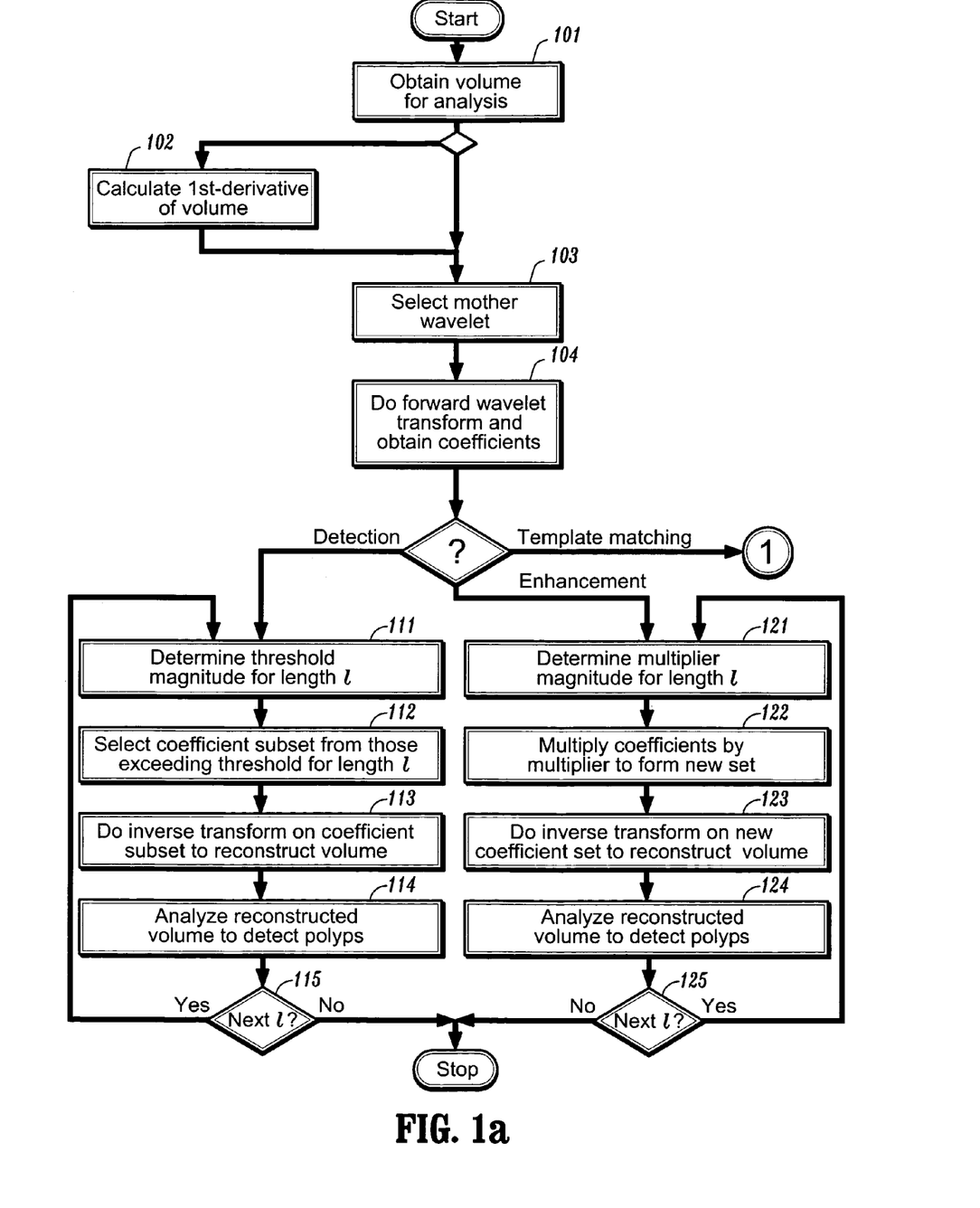
FIGS. 1a-b depict a flow chart of a preferred method of the invention.

After preprocessing the image, one can perform a forward wavelet decomposition of a volume of data points via, e.g., the lifting scheme, using an appropriate mother scaling function. Although the volume being analyzed can be an image volume, it need not be so and the volume data points can have other meanings, as will be discussed below. For ease of explanation, the embodiments described herein below will be described in terms of an image. Referring now to FIG. 1a, after obtaining a volume of data points for analysis at step 101, one then selects a mother wavelet function at step 103, and performs the forward wavelet transform on the data volume at step 104. A first embodiment of the invention can be used for the detections of polyps and other structures of interest. Assuming one started with an image comprising n points, one ends up with a set of n coefficients of varying length scales. A wavelet basis function whose shape and length scale correspond to a polyp (or cavity) will have a coefficient of much greater magnitude than a wavelet corresponding to a fold or other elongated structure of similar size.

A coefficient threshold can then be defined at step 111 for each scale coefficient l based on the intensity: $\gamma_{th}=2^{-l}\beta$, where $\beta$ represents a threshold intensity value, and that subset of m coefficients whose magnitudes exceeds the threshold $\gamma_{th}$ is then selected at step 112. For a first few times that this procedure is applied for detecting a polyp, $\beta$ will be determined by inspection. However, once an appropriate value of $\beta$ has been found, that value can be automatically applied in future detection procedures. The intensity threshold $\gamma_{th}$ is determined to eliminate noise at each scale. Note that the intensity threshold increases for decreasing length scale l. This accounts for the fact coefficients are more sensitive to noise as the length scale decreases.

The image can then be reconstructed from the subset of m coefficients at step 113 using the inverse wavelet transform. The resulting reconstructed image will contain those regions suspected of being a polyp, which can then be analyzed at step 114 to detect the polyp. This process of determining a coefficient threshold for each scale value l, selecting a subset of coefficients exceeding that threshold, and reconstructing the image from that subset to find a polyp can be performed for each length scale l. Thus, for each l, one obtains a subset $S_l$ of coefficients whose magnitude exceeds the threshold $\gamma_{th}$. This repeated process enables one to detect polyps of different sizes.

Second Embodiment

Enhancement

In a second embodiment of the invention, after suitable preprocessing, one can again start by performing a forward wavelet decomposition of an image of n points to obtain n basis functions and associated coefficients.

Figure 2:
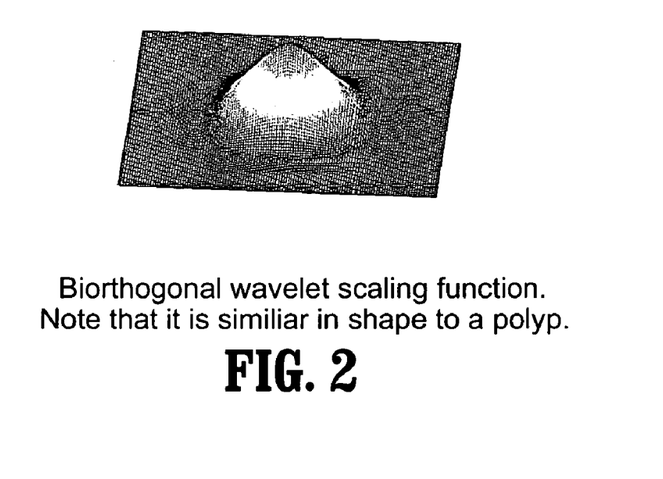
FIG. 2 depicts a biorthogonal wavelet scaling function.
Figure 3:
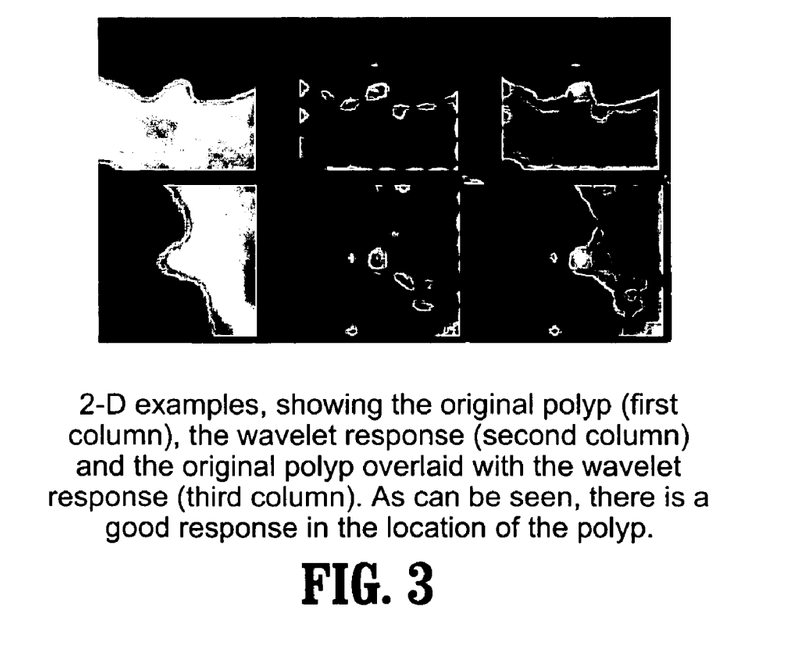
FIG. 3 depicts a 2D image of a polyp, the wavelet response of that polyp, and the original polyp overlaid with the wavelet response.
Figure 4:
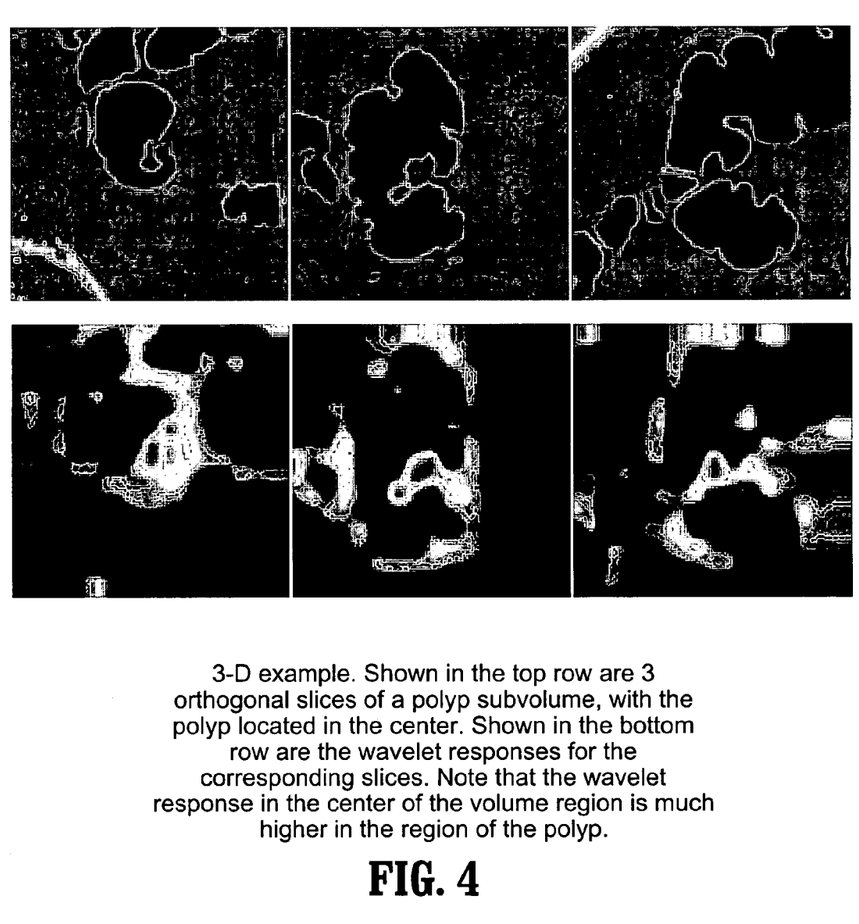
FIG. 4 depicts in the top row 3 orthogonal slices of a polyp subvolume, with the polyp located in the center, and in the bottom row, the wavelet responses for the corresponding slices.

In this embodiment, rather than thresholding the coefficients, one determines at step 121 a fixed multiplier value that is dependent on scale: $\gamma_l=2^{-l}\alpha\gamma_l$, where $\alpha$ is a constant multiplier coefficient. The wavelet coefficients are multiplied by this multiplier at step 122. As with the first embodiment, for the first few times that this procedure is applied for detecting a polyp, $\alpha$ will be determined by inspection. However, once an appropriate value of $\alpha$ has been found, that value can be automatically applied in future enhancement procedures. One can then reconstruct the volume at step 123 by using the inverse wavelet transform on the primed set of coefficients. The resulting volume would contain those regions suspicious of being a polyp appearing enhanced or highlighted due to the multiplication by $\alpha$, and can be analyzed at step 124. Examples are shown in FIGS. 2 and 3. Once again, this process can be repeated for each length scale to find polyps of different sizes.

Third Embodiment

Detection by Template Matching

Figure 1B:
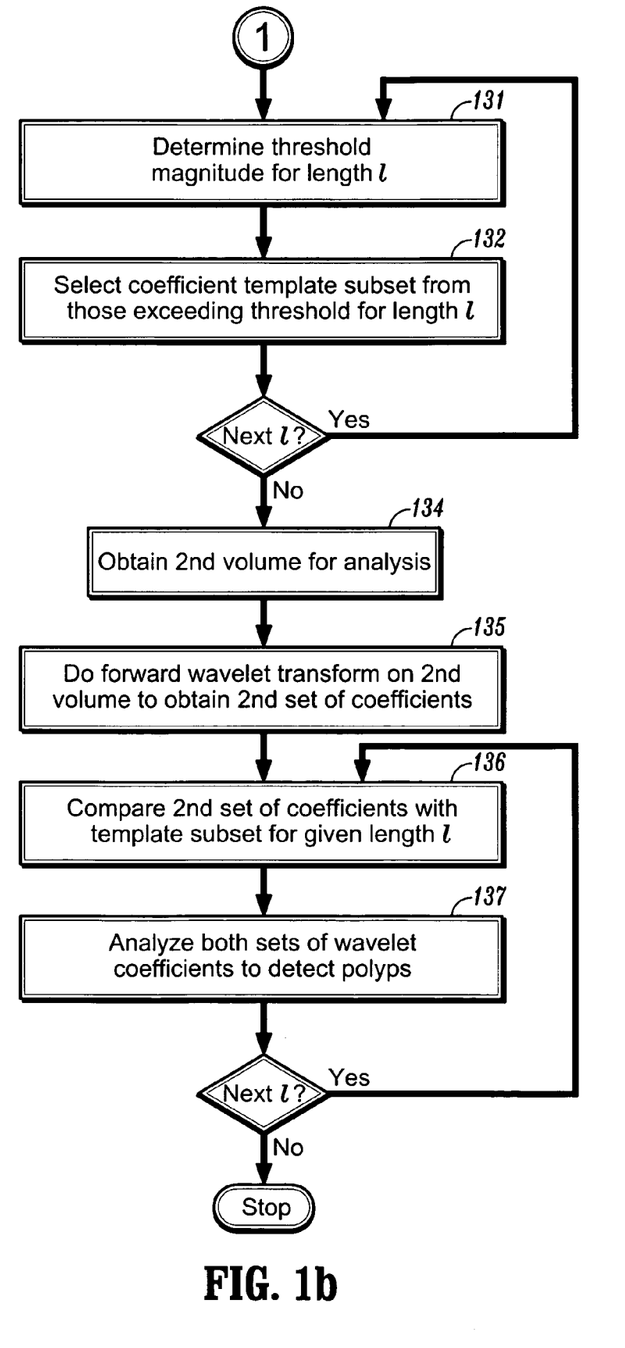

In the third embodiment of invention, one seeks to detect a polyp in the wavelet domain rather than the spatial domain. Once again, after suitable preprocessing, one can start by performing a forward wavelet decomposition of an image of n points to obtain n basis functions and associated coefficients. Turning now to FIG. 1b, as in the first embodiment, coefficient thresholds can be defined at step 131 for each scale coefficient l based on the intensity: $\gamma_{th}=2^{-l}\beta$, where $\beta$ represents a threshold intensity value, and that subset of m coefficients exceeding the threshold $\gamma_{th}$ is then selected at step 132. This process is repeated to select a subset of coefficients $T_l$ for each length scale l, and can also be repeated for differently shaped basis functions.

These subsets of coefficients can then be used as templates for detecting polyps as follows. Given another input image volume at step 134, one can apply the forward wavelet transform to obtain another set of wavelet coefficients at step 135. One can then match this set of wavelet coefficients with a template for a given l at step 136 to detect a polyp. For each value of l, one seeks a subset of wavelet coefficients of the image being analyzed that match the coefficients in the template set $T_l$. By matching is meant that a wavelet coefficient of the image being analyzed has the same translation and length scale indices as a template set coefficient of the same magnitude, or approximately same magnitude. If, at step 137, every coefficient in a template set $T_l$ can be associated in this manner to a coefficient of the image to be analyzed, then a match has been found. Identification of such a subset is indicative of the presence of a polyp whose size corresponds to the length scale 1 of the template set $T_l$. This technique of template matching in the wavelet domain is quite robust with respect to noise and other structures.

A further variation of the invention is based on the fact that the first derivative of a polyp has a unique signature that can be detected using the wavelet coefficients. This signature of a polyp is due to the fact that since a polyp is usually attached to an organ wall, it is usually semi-spherical in shape, as opposed to being fully spherical. The calculation of the first derivative of the image is performed at step 102, prior to selecting the mother wavelet scaling function and performing the forward wavelet transform. Thus, in these embodiments, instead of applying the wavelet transform to the raw images, the wavelet transform is applied to the magnitude of the derivatives of the original volume. This variation can be utilized in each of the three embodiments discussed above.

There are several advantages to using wavelets for the detection of polyps. Wavelets are multiscale: one can obtain an idea of the size of a polyp by looking at the response at various length scales. The wavelet transform can be computed in-place, and is thus memory efficient. Furthermore, the transform is linear in the number of voxels, and is thus computationally efficient to calculate.

Note that the methods presented herein can be easily extended from finding solid shapes to finding holes or missing shapes in a substrate. In addition, these methods can be applied to not just the imaged volume, but also to alternative volumes created, for example, by filtering.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
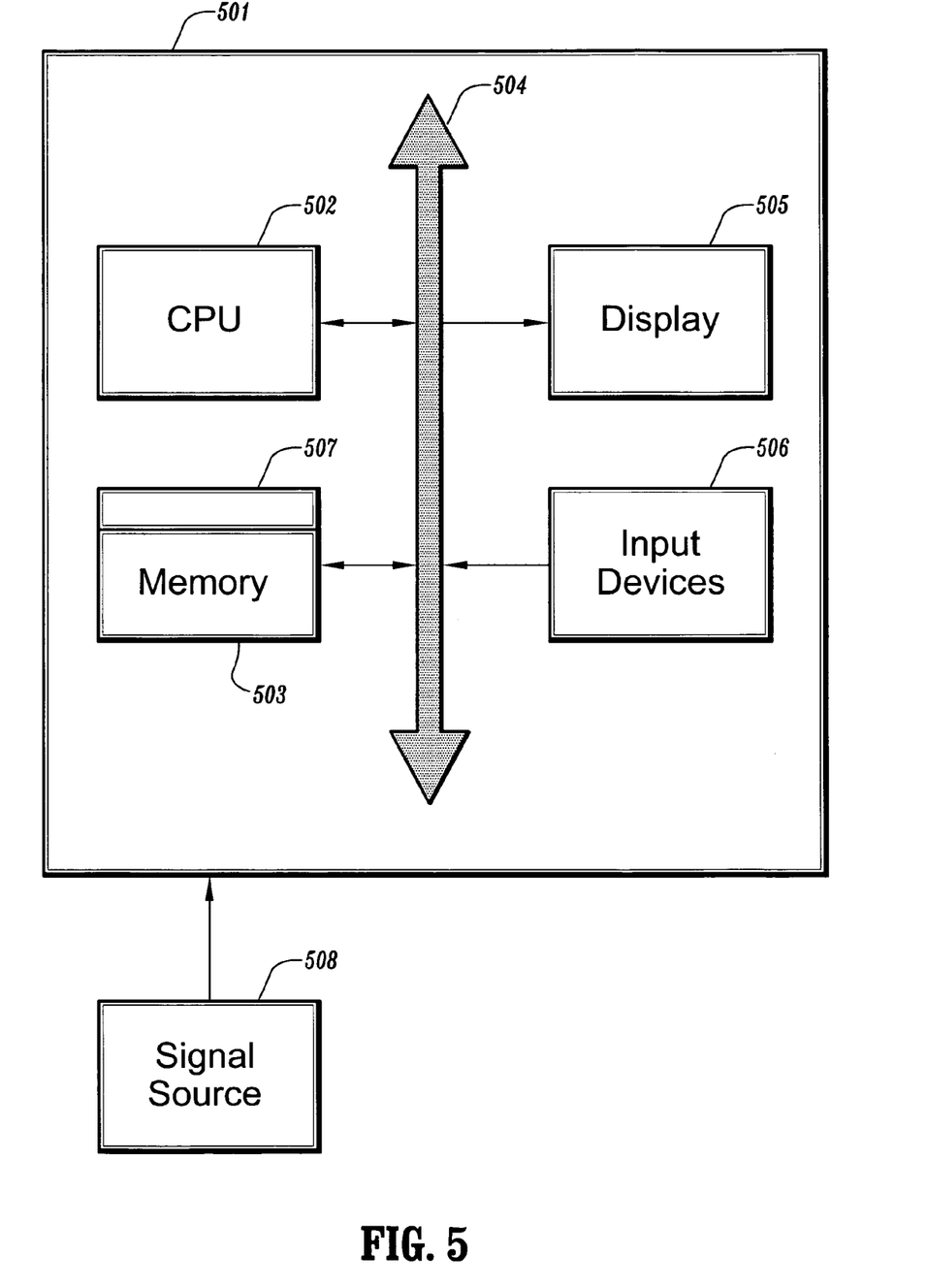
FIG. 5 depicts an exemplary computer system for implementing a preferred embodiment of the invention.

Referring now to FIG. 5, according to an embodiment of the present invention, a computer system 501 for implementing the present invention can comprise, inter alia, a central processing unit (CPU) 502, a memory 503 and an input/output (I/O) interface 504. The computer system 501 is generally coupled through the I/O interface 504 to a display 505 and various input devices 506 such as a mouse and a keyboard. The support circuits can include circuits such as cache, power supplies, clock circuits, and a communication bus. The memory 503 can include random access memory (RAM), read only memory (ROM), disk drive, tape drive, etc., or a combinations thereof. The present invention can be implemented as a routine 507 that is stored in memory 503 and executed by the CPU 402 to process the signal from the signal source 508. As such, the computer system 501 is a general purpose computer system that becomes a specific purpose computer system when executing the routine 507 of the present invention.

The computer system 501 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of identifying colon polyps in a digital volume, wherein said volume comprises a plurality of values corresponding to a domain of points in a 3D space, said method comprising the steps of:

selecting a mother wavelet scaling function that corresponds to a polyp;

performing a forward wavelet transformation on said volume to obtain a set of wavelet coefficients, wherein each wavelet coefficient is associated with a length scale;

determining, for each length scale, a transformation magnitude, wherein the transformation magnitude comprises a multiplier magnitude;

forming, for each length scale, a transformed set of wavelet coefficients associated with said length scale by multiplying, for each length scale, the wavelet coefficients by the multiplier for that length scale to form a multiplied coefficient set for said length scale;

performing, for each length scale, an inverse wavelet transform on the transformed wavelet coefficients corresponding to said length scale, to obtain a reconstructed volume, wherein said inverse wavelet transform is performed on said multiplied coefficient set for said length scale;

analyzing said reconstructed volume for the existence of polyps; and prior to performing the forward wavelet transform, calculating a first derivative of said volume, and selecting the mother wavelet function to be similar to a first derivative of a polyp.

2. A method of identifying colon polyps in a digital volume, wherein said volume comprises a plurality of values corresponding to a domain of points in a 3D space, said method comprising the steps of:

selecting a mother wavelet scaling function that corresponds to a polyp;

performing a forward wavelet transformation on said volume to obtain a set of wavelet coefficients, wherein each wavelet coefficient is associated with a length scale;

determining, for each length scale, a multiplier magnitude;

multiplying, for each length scale, the wavelet coefficients by the multiplier for that length scale to form a multiplied coefficient set for said length scale;

performing, for each length scale, an inverse wavelet transform on the multiplied coefficient set corresponding to said length scale, to obtain a reconstructed volume;

analyzing said reconstructed volume for the existence of polyps; and prior to performing the forward wavelet transform, calculating a first derivative of said volume, and selecting the mother wavelet function to be similar to a first derivative of a polyp.

3. A program storage device readable by a computer, tangibly embodying a program of instructions executable by the computer to perform method steps for identifying colon polyps in a digital volume, wherein said volume comprises a plurality of values corresponding to a domain of points in a 3D space, said method comprising the steps of:

selecting a mother wavelet scaling function that corresponds to a polyp;

performing a forward wavelet transformation on said volume to obtain a set of wavelet coefficients, wherein each wavelet coefficient is associated with a length scale;

determining, for each length scale, a transformation magnitude, wherein the transformation magnitude comprises a multiplier magnitude;

forming, for each length scale, a transformed set of wavelet coefficients associated with said length scale by multiplying, for each length scale, the wavelet coefficients by the multiplier for that length scale to form a multiplied coefficient set for said length scale;

performing, for each length scale, an inverse wavelet transform on the transformed wavelet coefficients corresponding to said length scale, to obtain a reconstructed volume, wherein said inverse wavelet transform is performed on said multiplied coefficient set for said length scale;

analyzing said reconstructed volume for the existence of polyps; and prior to performing the forward wavelet transform, calculating a first derivative of said volume, and selecting the mother wavelet function to be similar to a first derivative of a polyp.

* * * * *